under 35

(12) United States Patent  (10) Patent No.: US 11,496,721 B2
Ichieda et al.  (45) Date of Patent: Nov. 8, 2022

(54) SETTING ASSISTANCE METHOD AND SETTING ASSISTANCE APPARATUS

(71) Applicant: SEIKO EPSON CORPORATION, Tokyo (JP)

(72) Inventors: Hiroyuki Ichieda, Matsumoto (JP); Ippei Kurota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/215,034

(22) Filed: Mar. 29, 2021

(65) Prior Publication Data

US 2021/0306605 A1  Sep. 30, 2021

(30) Foreign Application Priority Data

Mar. 30, 2020  (JP) .............................. JP2020-059815

(51) Int. Cl.
  *H04N 9/31*  (2006.01)
(52) U.S. Cl.
  CPC ......... *H04N 9/3188* (2013.01); *H04N 9/3185* (2013.01); *H04N 9/3194* (2013.01)
(58) Field of Classification Search
  CPC ................ G03B 21/147; G03B 21/208; G03B 21/2053; H04N 9/3147; H04N 9/3182; H04N 9/3185; H04N 9/3194
  See application file for complete search history.

(56) References Cited

U.S. PATENT DOCUMENTS

| 8,944,607 | B2* | 2/2015 | Ichieda | H04N 9/3185 |
| | | | | 353/69 |
| 10,802,383 | B2* | 10/2020 | Imai | G06T 5/006 |
| 2013/0342816 | A1* | 12/2013 | Furui | G03B 21/147 |
| | | | | 353/69 |
| 2014/0049756 | A1* | 2/2014 | Oka | H04N 5/7416 |
| | | | | 353/121 |
| 2019/0051194 | A1* | 2/2019 | Campos Macias | G08G 5/0078 |
| 2019/0191134 | A1* | 6/2019 | Urano | H04N 9/3194 |
| 2020/0275069 | A1* | 8/2020 | Tanaka | H04N 9/3185 |

FOREIGN PATENT DOCUMENTS

| JP | 2006-033357 A | 2/2006 |
| JP | 2013-192098 A | 9/2013 |
| JP | 2015-192310 A | 11/2015 |
| JP | 2017-212638 A | 11/2017 |

* cited by examiner

*Primary Examiner* — Sultan Chowdhury
(74) *Attorney, Agent, or Firm* — Oliff PLC

(57) ABSTRACT

There is provided a setting assistance apparatus including a touch panel, which includes a display apparatus, a camera, and a processor. The processor programmed to cause the camera to capture an image of a projection image projected by a projector on a target to generate a captured image, cause the display apparatus to display the captures image, superimposes a guide image that prompts execution of the operation of setting at least one of the position or size of the projection image on the captured image, and cause the display apparatus to display the superimposed image.

7 Claims, 5 Drawing Sheets

FIG. 6

| DIGIT | FOR COORDINATE X | | FOR COORDINATE Y | |
|---|---|---|---|---|
| | POSITIVE PATTERN | NEGATIVE PATTERN | POSITIVE PATTERN | NEGATIVE PATTERN |
| (MSB) 6bit | | | | |
| 5bit | | | | |
| 4bit | | | | |
| 3bit | | | | |
| 2bit | | | | |
| 1bit | | | | |
| 0bit (LSB) | | | | |

SETTING ASSISTANCE METHOD AND SETTING ASSISTANCE APPARATUS

The present application is based on, and claims priority from JP Application Serial Number 2020-059815, filed Mar. 30, 2020, the disclosure of which is hereby incorporated by reference herein in its entirety.

BACKGROUND

1. Technical Field

The present disclosure relates to a setting assistance method and a setting assistance apparatus.

2. Related Art

When a projector or any other apparatus projects an image on a surface of a target having a three-dimensional shape, for example, in projection mapping, to allow the image to look as if the image were attached to the surface of the target, it is necessary to measure the position of the image to be projected and adjust the shape and other factors of the image in advance. JP-A-2006-33357 describes that an image of a target on which a projection image is projected is captured with a camera, that the captured image is used to measure the position of the projection image, and that the projection image is geometrically corrected in accordance with the result of the measurement.

In the technology disclosed in JP-A-2006-33357, the size of the projection image contained in the captured image decreases depending on the imaging position where the camera captures an image of the projection image. When the projection image contained in the captured image is not large enough, the resolution of the measurement of the position of the projection image lowers, resulting in inaccurate geometric correction. That is, the technology disclosed in JP-A-2006-33357 has a problem of a decrease in accuracy of the measurement of the position of the projection image when a user is inexperienced, for example, in installation of the camera. It is similarly difficult for an inexperienced user to appropriately set the position where the projection image is located in the captured image.

SUMMARY

The present disclosure has been made in view of the problems described above, and an object of the present disclosure is to provide a technology that allows a user who is inexperienced in setting of at least one of the position or size of a projection image to readily perform the setting.

To achieve the object described above, a setting assistance method according to an aspect of the present disclosure includes capturing an image of a projection image projected by a projector on a target to generate a captured image and accepting an operation of setting at least one of a position or a size of the projection image in the captured image.

To achieve the object described above, a setting assistance apparatus according to another aspect of the present disclosure includes a processor programmed to cause a camera to capture an image of a projection image projected by a projector on a target to generate a captured image and accept the operation of setting at least one of a position or a size of the projection image in the captured image.

BRIEF DESCRIPTION OF THE DRAWINGS

FIG. 6 shows an example of measurement patterns generated by a measurement section of the setting assistance apparatus.

DESCRIPTION OF EXEMPLARY EMBODIMENTS

An embodiment of the present disclosure will be described below with reference to the drawings. A variety of technically preferable restrictions are imposed on the embodiment described below. The embodiment of the present disclosure is, however, not limited to the form described below.

1. Embodiment

Figure 1:
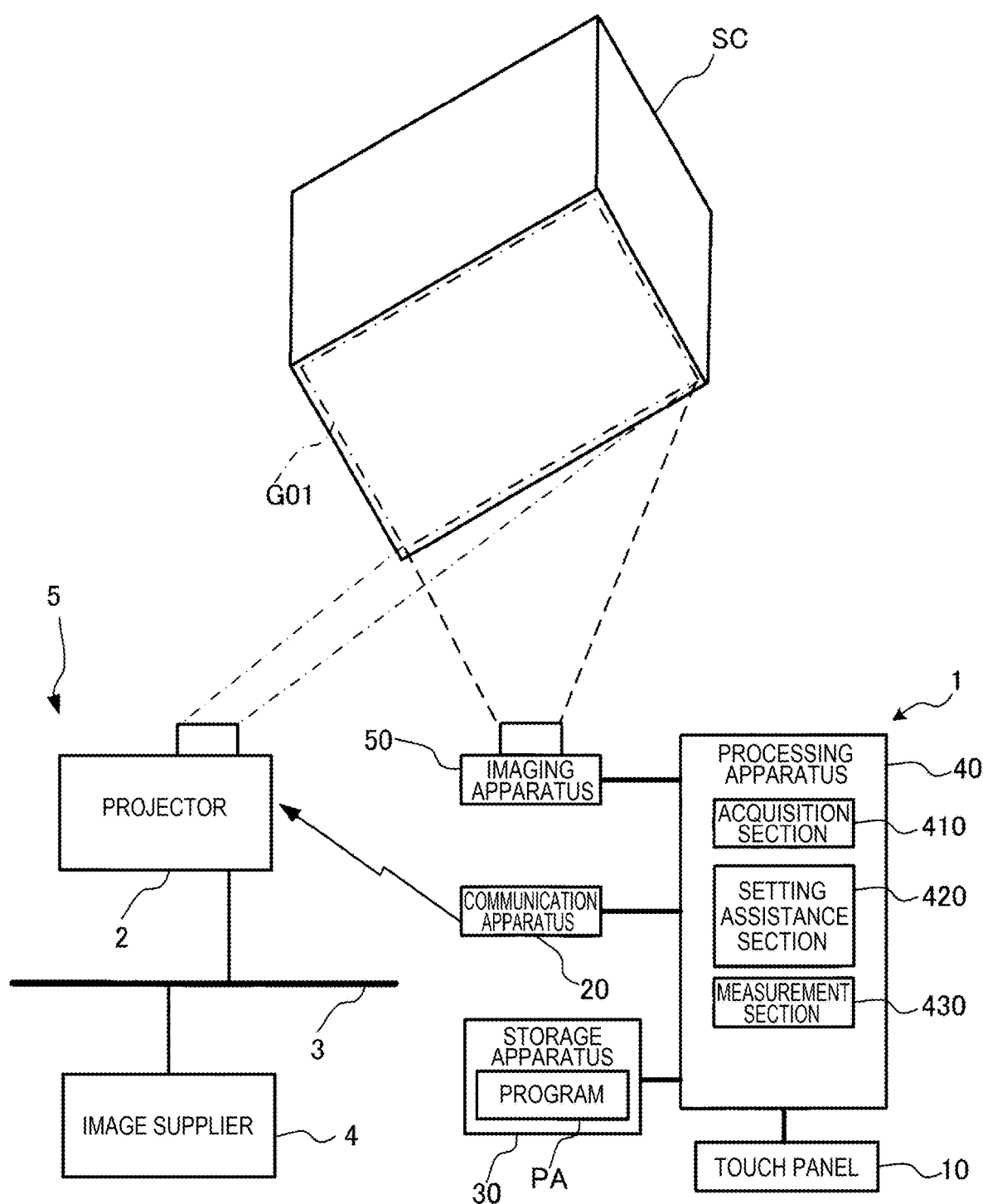
FIG. 1 shows an example of the configurations of a setting assistance apparatus according to an embodiment of the present disclosure and an image display system including a projector.

FIG. 1 is a block diagram showing an example of the configurations of a setting assistance apparatus 1 according to an embodiment of the present disclosure and an image display system 5 including a projector 2. The projector 2 is connected to a network 3. Specific examples of the network 3 may include a wired LAN (local area network), a wireless LAN, and a Bluetooth. Bluetooth is a registered trademark. An image supplier 4 as well as the projector 2 is connected to the network 3. The image supplier 4 supplies the projector 2 with image data. In the image display system 5 shown in FIG. 1, the projector 2 projects an image G01 according to the image data supplied from the image supplier 4 or the setting assistance apparatus 1 on the surface of a target SC. In FIG. 1, the projector 2 includes a light source, three display panels as a light modulator, a projection lens, and a display panel driver, although not illustrated in detail. The three display panels correspond to red, green, and blue. In the present embodiment, the display panels are each a liquid crystal light valve. The display panel driver controls the optical transmittance in each of the three display panels described above in accordance with the image data supplied from the image supplier 4 or the setting assistance apparatus 1. In the projector 2, the three display panels modulate the light outputted from the light source to form image light, and the projection lens projects the image light to display an image on the surface of the target SC. The target SC in the present embodiment has a box-like shape, as shown in FIG. 1 and may have a three-dimensional shape formed of polygons, such as a triangular or quadrangular pyramid, linked to each other.

The setting assistance apparatus 1 is, for example, a smartphone. The setting assistance apparatus 1 has a communication function that allows the setting assistance apparatus 1 to communicates with the projector 2 and an imaging function. The setting assistance apparatus 1 is not limited to a smartphone and may, for example, be a tablet terminal having the communication function and the imaging function described above. When the setting assistance apparatus 1 is connected to the projector 2 over the network, the setting assistance apparatus 1 communicates with the projector 2 and acquires projector information from the projector 2. In the present embodiment, the setting assistance apparatus 1 is connected to the projector 2 over the network when the projector 2 is calibrated. The projector information includes a product model code representing the model of the projector 2, version information representing the version of firmware installed in the projector 2, resolution information, and compression format information representing a compression format decodable in the projector 2. The resolution information is information representing the resolution of the display panels in the projector 2. The product model code or the version information may be used when the setting assistance apparatus 1 evaluates whether or not the projector 2 is a projector that supports a setting assistance method according to the present disclosure. The resolution information is used by the setting assistance apparatus 1 when the setting assistance apparatus 1 generates a measurement pattern for measurement of the position of a projection image projected by the projector 2 on the target SC. Although will be described later in detail, a binary code pattern is used as the measurement pattern in the present embodiment. The compression format information is used to determine a compression format in accordance with which the measurement pattern data is compressed when measurement pattern data representing the measurement pattern is compressed and the compressed measurement pattern data is sent from the setting assistance apparatus 1 to the projector 2. The compression format used when the measurement pattern data is compressed and the compressed measurement pattern data is sent from the setting assistance apparatus 1 to the projector 2 is desirably a reversible compression format, such as run-length, LZH, PNG, and GIF compression. When one type of the product model code, the version information, the resolution information, and the compression format information allows identification of the others, for example, when a product model indicated by the product model code allows identification of the version information, the resolution information, and the compression format information, only the one type of information may be contained in the projector information. That is, the projector information may contain at least one of the product model code, the version information, the resolution information, and the compression format information.

The setting assistance apparatus 1 uses the resolution information acquired from the projector 2 to generate measurement pattern data representing each of a plurality of measurement patterns and provides the projector 2 with the generated measurement pattern data. The projector 2 projects an image of each of the measurement patterns indicated by the measurement pattern data provided from the setting assistance apparatus 1 on the target SC. The image of each of the measurement patterns is an example of a pattern image in the present disclosure. It is noted that the setting assistance apparatus 1 may send a command to the projector 2, and the projector 2 may generate the measurement pattern data based on the command. In this case, the projector information does not need to contain the compression format information. In the aspect in which the projector 2 generates the measurement pattern data, a communication period for which the setting assistance apparatus 1 transmits the measurement patterns to the projector 2 can be advantageously shortened. The setting assistance apparatus 1 uses the imaging function described above to capture an image of each of the plurality of measurement patterns projected by the projector 2 on the target SC and measures the position of the projection image based on the plurality of captured images captured by the setting assistance apparatus 1. The measurement of the position of the projection image refers to association of the coordinates of the projection image in a captured image captured by the imaging apparatus 50 with the coordinates of the projection image in the display panels of the projector 2, specifically, generation of a transformation matrix for performing projective transformation between the former coordinates and the latter coordinates. To measure the position of the projection image as described above, the acquisition of the projector information needs to have been completed. Since the acquisition of the projector information is a process carried out after the setting assistance apparatus 1 is connected to the projector 2 over the network, the measurement of the position of the projection image is also a process carried out after the setting assistance apparatus 1 is connected to the projector 2 over the network.

When the target SC contained in the captured image is not large enough, the accuracy of the measurement of the position of the projection image based on the captured image decreases, as described above. The setting assistance apparatus 1 according to the present embodiment is, however, configured to prompt the user to perform the operation of adjusting the position of the setting assistance apparatus 1 or zooming in such a way that the target SC contained in the captured image is large enough, whereby even a user who is inexperienced in handling the setting assistance apparatus 1 can measure the position of the projection image with accuracy. The setting assistance apparatus 1 distinctively exhibiting the features of the present embodiment will be primarily described below.

The setting assistance apparatus 1 includes a touch panel 10, a communication apparatus 20, a storage apparatus 30, a processing apparatus 40, and the imaging apparatus 50, as shown in FIG. 1. The communication apparatus 20 is a wireless or wired communication module. When the communication apparatus 20 is a wired communication module, the communication apparatus 20 is connected to the projector 2 via a communication line. The connection between the setting assistance apparatus 1 and the projector 2 may be direct connection via no relay apparatus, such as a wireless access point apparatus or a router, or may be indirect connection via a relay apparatus. When the communication apparatus 20 is a wireless communication module, a specific example of the direct connection may be ad-hoc connection, and a specific example of the indirect connection may be access point connection via a wireless access point apparatus. When the communication apparatus 20 is a wired communication module, a specific example of the direct connection may be peer-to-peer connection, and a specific example of the indirect connection may be connection via a wired router or a wired hub. The communication apparatus 20 communicates with the projector 2 under the control of the processing apparatus 40. The imaging apparatus 50 is a camera. The imaging apparatus 50 performs imaging under the control of the processing apparatus 40 and supplies the processing apparatus 40 with image data representing a captured image.

The touch panel 10 is an apparatus formed of a display apparatus that displays an image and an input apparatus to which the user inputs information with the display apparatus and the input apparatus integrated with each other. The input apparatus is, for example, a transparent-sheet-shaped contact sensor. The input apparatus is so provided as to cover the display surface of the display apparatus. The input apparatus uses electrostatic capacity identified by the input apparatus and a body in contact therewith to detect the touch position and outputs data representing the detected touch position to the processing apparatus 40. The content of the user's operation performed on the touch panel 10 is thus transmitted to the processing apparatus 40.

The storage apparatus 30 is a recording medium readable by the processing apparatus 40. The storage apparatus 30 includes, for example, a nonvolatile memory and a volatile memory. The nonvolatile memory is, for example, a ROM (read only memory), an EPROM (erasable programmable read only memory), or an EEPROM (electrically erasable programmable read only memory). The volatile memory is, for example, a RAM (random access memory).

The nonvolatile memory of the storage apparatus 30 stores a program PA executed by the processing apparatus 40. The volatile memory of the storage apparatus 30 is used by the processing apparatus 40 as a work area when the processing apparatus 40 executes the program PA. The program PA can also be referred to as an "application program," "application software," or an "app." The program PA is acquired, for example, from a server or any other component that is not shown via the communication apparatus 20 and then stored in the storage apparatus 30. The program PA may instead be stored in the storage apparatus 30 in advance.

The processing apparatus 40 includes, for example, a processor, such as a CPU (central processing unit). The processing apparatus 40 may be formed of a single processor or a plurality of processors. Triggered by the operation performed on the touch panel 10 that instructs start of execution of the program PA, the processing apparatus 40 reads the program PA from the nonvolatile memory, transfers the read program PA to the volatile memory, and starts executing the program PA. The processing apparatus 40 that operates in accordance with the program PA functions as an acquisition section 410, a setting assistance section 420, and a measurement section 430 shown in FIG. 1. The acquisition section 410, the setting assistance section 420, and the measurement section 430 shown in FIG. 1 are each a software module achieved when the processing apparatus 40 operates in accordance with the program PA.

The acquisition section 410 communicates with the projector 2 and acquires the projector information from the projector 2 when an instruction of acquisition of the projector information is given by operation performed on the touch panel 10 to the acquisition section 410 in the situation in which the setting assistance apparatus 1 is connected to the projector 2 over the network. The setting assistance apparatus 1 is connected to the projector 2 over the network when the projector 2 is calibrated, as described above. That is, the projector information acquisition process carried out by the acquisition section 410 is a process carried out after the calibration. A variety of methods are conceivable as a method for achieving the connection between the setting assistance apparatus 1 and the projector 2 over the network.

For example, the following aspect is conceivable: A sheet on which a QR code containing setting information representing network setting of the projector 2 is printed is attached to the enclosure of the projector 2; the imaging apparatus 50 captures an image of the QR code; the processing apparatus 40 acquires the setting information described above; and the setting assistance apparatus 1 is connected to the projector 2 over the network in accordance with the acquired setting information. The QR code is a registered trademark. As another conceivable aspect, the projector 2 may project the QR code, and the imaging apparatus 50 may capture an image of the QR code. In the case where the projector 2 projects the QR code, when the QR code contained in the captured image is not greater than or equal to a predetermined size or the QR code contained in the captured image is so large that part of the QR code is not contained in the captured image, the acquisition of the setting information from the captured QR code is hindered in some cases. To avoid the problem described above, when the QR code contained in the captured image is smaller than the predetermined size or part of the QR code is not contained in the captured image, the user may perform touch operation on the touch panel 10 to adjust optical zooming performed by the imaging apparatus 50 to enlarge or reduce the QR code. In place of the adjustment of the optical zooming, the QR code in the captured image may be enlarged or reduced by movement of the user who carries the setting assistance apparatus 1 and captures an image of the QR code or a change in the distance between the QR code and the setting assistance apparatus 1, for example, by moving the setting assistance apparatus 1 away from or toward the QR code. Further, in either of the aspect in which the optical zooming is adjusted or the aspect in which the distance between the QR code and the setting assistance apparatus 1 is changed, a guide image having the predetermined size may be displayed with the guide image superimposed on the captured image to use the guide image as a reference for enlargement or reduction of the QR code.

When the setting assistance apparatus 1 has a communication function that allows the setting assistance apparatus 1 to communicate with an NFG tag, it is conceivable to employ an aspect in which an NFG tag that stores the setting information described above is built in the projector 2 and the setting assistance apparatus 1 is held over the location where the NFG tag is built in to allow the setting assistance apparatus 1 to acquire the setting information described above. Instead, a list of pieces of setting information on a plurality of projectors may be stored in advance in the storage apparatus 30 and displayed on the display apparatus of the touch panel 10, and the user may select a projector to be connected to the setting assistance apparatus 1. In this case, the plurality of projectors may each project an image, for example, of an encryption key used in authentication of the network connection, and the user may operate the touch panel 10 to input the encryption key projected by a projector desired to be connected to the setting assistance apparatus 1 and may use the inputted encryption key for the authentication.

The setting assistance section 420 causes the imaging apparatus 50 to capture an image of the target SC on which the projector 2 projects the projection image to generate a captured image and displays a guide image that prompts the user to perform the operation of setting at least one of the position and size of the projection image in the captured image with the guide image superimposed on the captured image. The process of displaying the guide image is also a process carried out after the setting assistance apparatus 1 is connected to the projector 2 over the network, that is, after the calibration.

In more detail, triggered by an instruction of display of an installation assistance screen given by operation performed on the touch panel 10 in the situation in which the setting assistance apparatus 1 is connected to the projector 2 over the network, the setting assistance section 420 gives the projector 2 installation pattern image data representing an installation pattern image to cause the projector 2 to project the installation pattern image. The installation pattern image is an image that allows the user to grasp the projection range of the projector 2. The installation pattern image may, for example, be an image formed of light having a single color, such as white, red, blue, and green, or may be a checker pattern image. The user of the setting assistance apparatus 1 adjusts as appropriate the focusing performed by the projector 2 and the focusing and exposure performed by the imaging apparatus 50 before final image capturing. After the adjustment is completed, the setting assistance section 420 causes the imaging apparatus 50 to capture an image of the target SC on which the projector 2 has projected the installation pattern image to generate a captured image. The setting assistance section 420 then superimposes the guide image that prompts the user to perform the operation of setting the position and size of the projection image on the captured image captured by the imaging apparatus 50 to generate the installation assistance screen and causes the display apparatus of the touch panel 10 to display the installation assistance screen.

Figure 2:
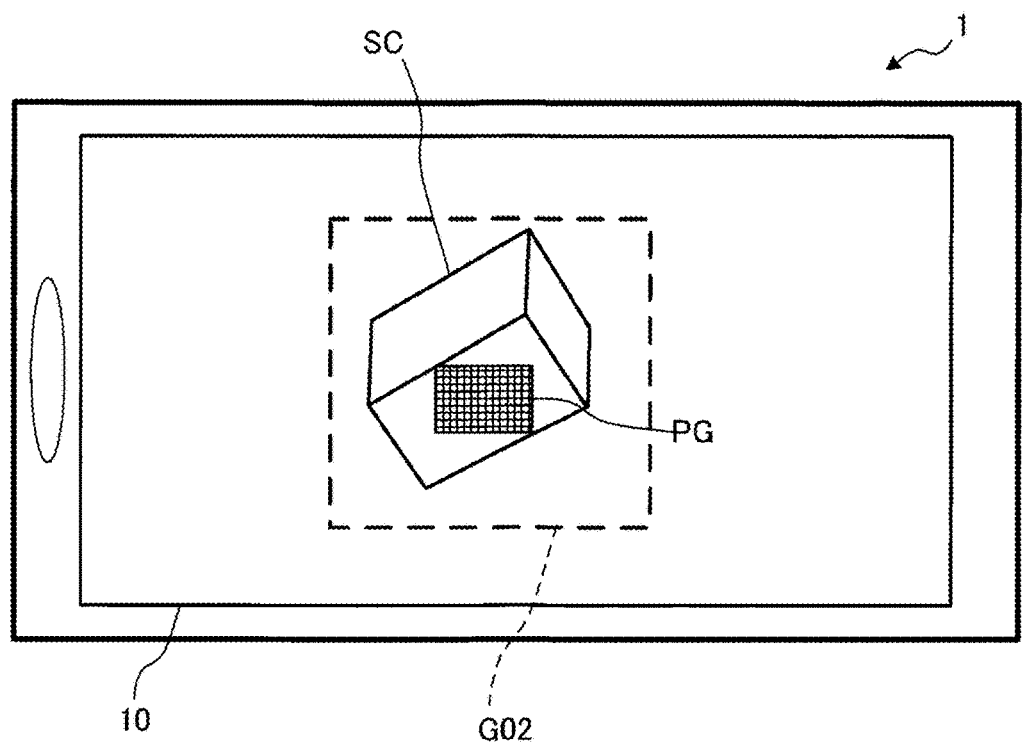
FIG. 2 shows an example of a displayed installation assistance screen.

FIGS. 2 to 5 show examples of the displayed installation assistance screen in the setting assistance apparatus 1. In FIG. 2, the guide image that prompts the user to perform the operation of setting the position and size of the projection image is a quadrangular image G02. The user of the setting assistance apparatus 1 adjusts the position and attitude of the setting assistance apparatus 1, the optical zooming performed by the imaging apparatus 50, and other factors in such a way that an installation pattern image PG projected on the target SC is larger than the image G02 in the captured image and then fixes the setting assistance apparatus 1, for example, with a tripod. In the present embodiment, the image G02 is so sized in advance that sufficient measurement accuracy is provided in three-dimensional measurement described later as long as the target SC is larger than the image G02 in the captured image. After the setting assistance apparatus 1 is fixed, for example, by using a tripod, the imaging apparatus 50 captures an image of the target SC in accordance with the image G02. In the present embodiment, the position of the projection image is measured, and an area where the projection image is disposed is set based on the captured image of the target SC captured in accordance with the image G02.

Figure 3:
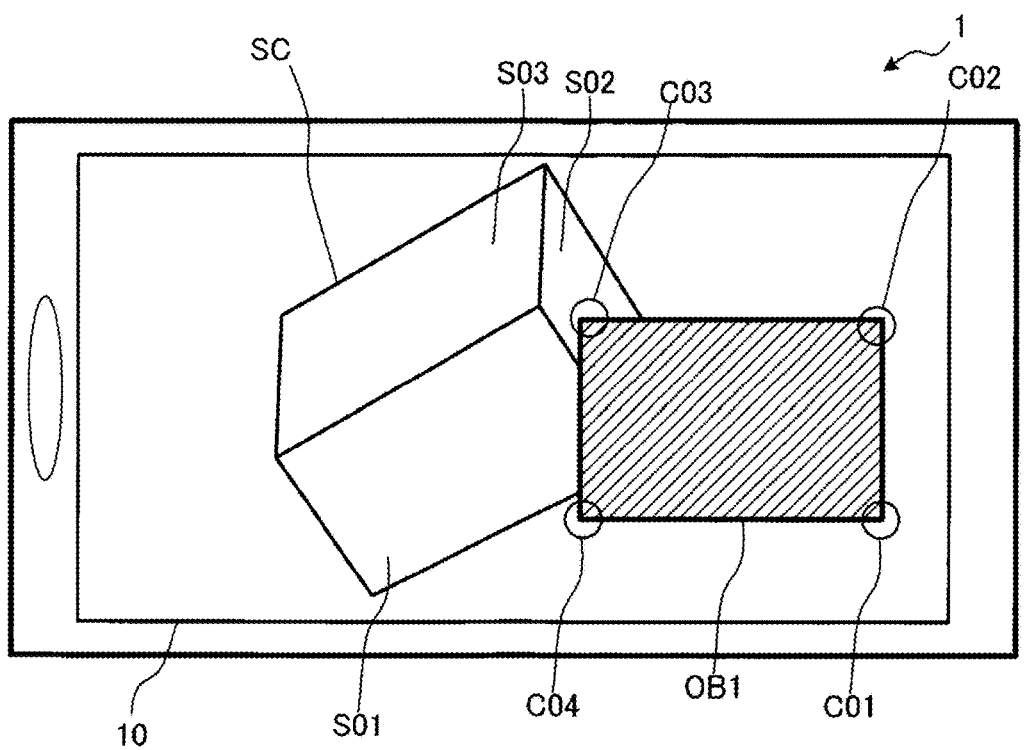
FIG. 3 shows an example of a displayed area setting assistance screen.
Figure 4:
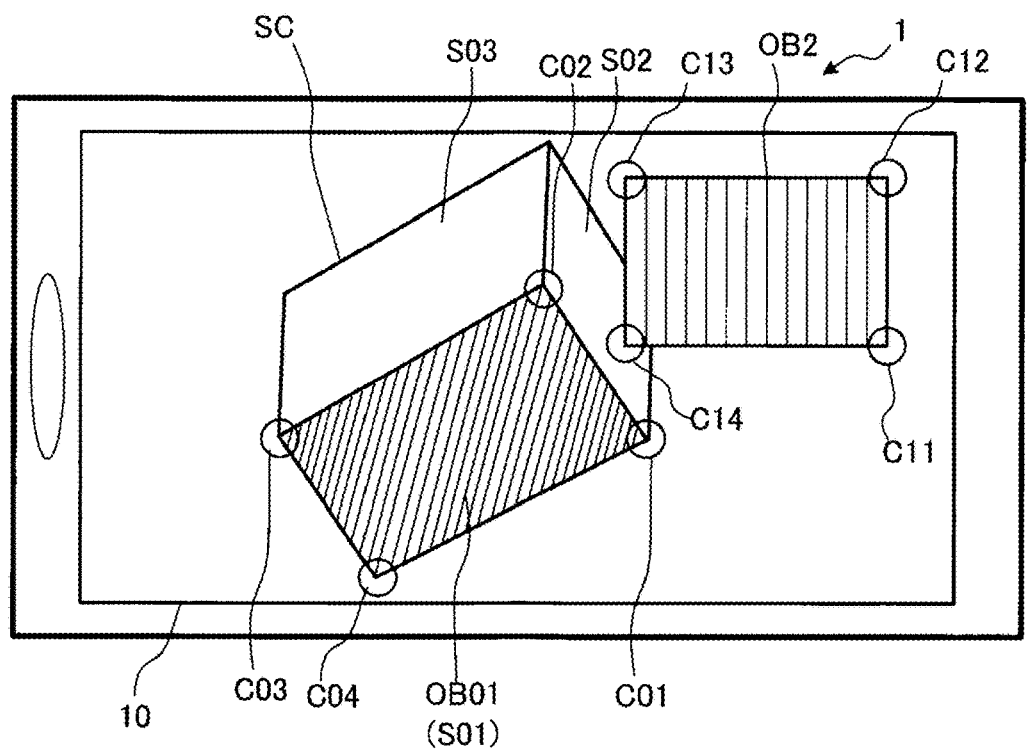
FIG. 4 shows another example of the displayed area setting assistance screen.
Figure 5:
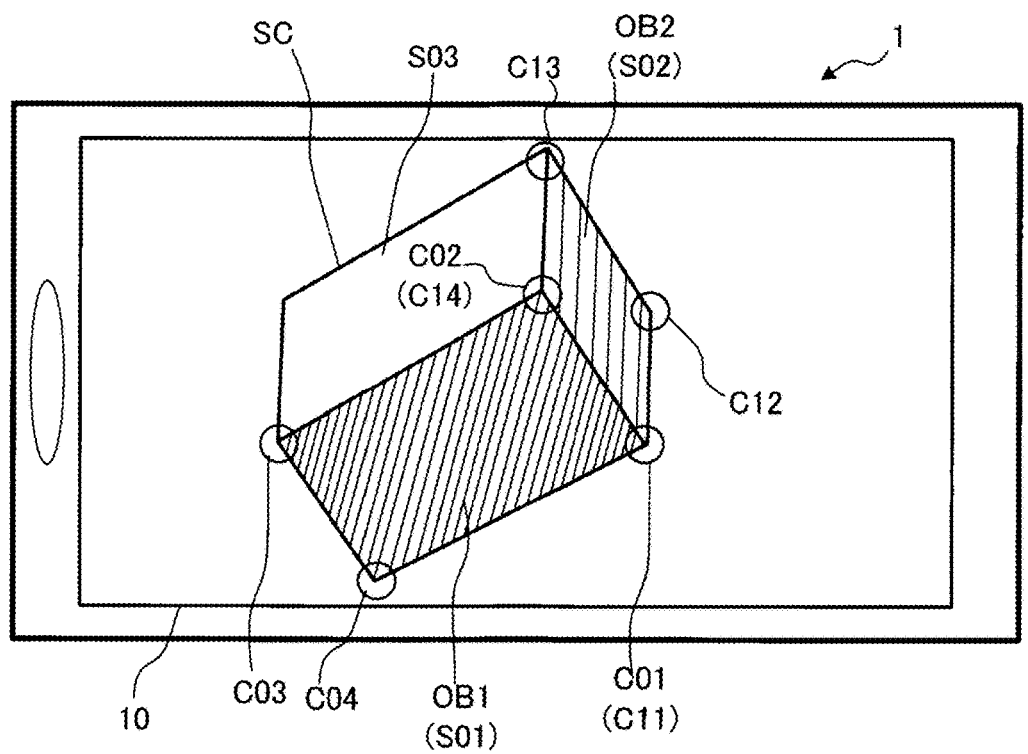
FIG. 5 shows another example of the displayed area setting assistance screen.

In the present embodiment, the area where the projection image is disposed in the captured image of the target SC, that is, the area occupied by the projection image is set by polygon linkage operation. The setting assistance section 420 also displays a guide image that prompts the user to perform the linkage operation, that is, the operation of setting the shape of the projection image. For example, when surfaces S01, S02, and S03 of the box-like shape of the target SC each serve as a projection surface, the area where the projection image is disposed is set by linking the quadrangles corresponding to the three surfaces, as shown in FIGS. 3 to 5. In this case, the setting assistance section 420 causes the display apparatus of the touch panel 10 to display an area setting assistance screen generated by superimposing quadrangular objects corresponding to the surfaces S01, S02, and S03 of the target SC on the captured image described above. The quadrangular objects described above play the following role: In the present embodiment, the user of the setting assistance apparatus 1 creates a content having the same size as that of the display panels of the projector 2 in the setting assistance apparatus 1, transfers the content to the projector 2, and causes the projector 2 to project an image according to the content. The user of the setting assistance apparatus 1 determines an in-content area where an image is displayed and an in-content area where no image is displayed. The quadrangular objects described above correspond to the area where an image is displayed. An image is assigned to the area where an image is displayed, and an image having been geometrically corrected is so attached as to be superimposed on the area. An image having a predetermined color, such as black, is projected on the area where no image is displayed. The format of data on the content is desirably a video or still image multimedia compression format, such as JPEG, GIF, PNG, Motion JPEG, H.264, and H265. As another form, information on an area of each of the display panels of the projector 2 that is the area where an image is displayed and data on the image to be displayed in the area may be transmitted to the projector 2, and the projector 2 may geometrically correct the image data.

In a more detailed description, triggered by an area setting instruction given by operation performed on the touch panel 10, the setting assistance section 420 causes the display apparatus of the touch panel 10 to display the area setting assistance screen generated by superimposing an object OB1, which is a quadrangular image, on the captured image of the target SC, as shown in FIG. 3. Instead, image data on the object OB1 may be transmitted from the setting assistance apparatus 1 to the projector 2, and the projector 2 may project the object OB1 on the target SC in accordance with the image data. Any one of the four vertices of the object OB1 is an example of a first vertex in the present disclosure, and the object OB1 is an example of a first image in the present disclosure. The setting assistance section 420 displays circles C01, C02, C03, and C04 around the four vertices of the object OB1, as shown in FIG. 3. The user sets an area corresponding to the surface S01 by operating the touch panel 10 to move and deform the object OB1 in such a way that the vertices of the surface S01 are superimposed on the vertices of the object OB1. FIG. 4 shows that the object OB1 has been set in the area corresponding to the surface S01. Whenever the object OB1 is moved or deformed, the image data on the object OB1 after the movement or deformation may be transmitted from the setting assistance apparatus 1 to the projector 2, and the object OB1 projected by the projector 2 on the target SC may be updated. The object OB1 and the circles C01, C02, C03, and C04, which are disposed at the four vertices of the object OB1, are an example of the guide image that prompts the user to perform the operation of setting the shape of the projection image.

When the area setting instruction is given again by operation performed on the touch panel 10 to the setting assistance section 420, the setting assistance section 420 displays an object OB2 for the second surface with an area corresponding to the surface S02 superimposed on the captured image having been set, as shown in FIG. 4. The object OB2 is a quadrangular image, as the object OB1 is. The above description also applies to the object OB2; image data on the object OB2 may be transmitted from the setting assistance apparatus 1 to the projector 2, and the projector 2 may project the image data on the target SC. Any one of the four vertices of the object OB2 is an example of a second vertex in the present disclosure, and the object OB2 is an example of a second image in the present disclosure. The setting assistance section 420 displays circles C11, C12, C13, and C14 around the four vertices of the object OB2, as shown in FIG. 4. The user sets an area corresponding to the surface S02 by operating the touch panel 10 to move and deform the object OB2 in such a way that the vertices of the surface S02 are superimposed on the vertices of the object OB2. FIG. 5 shows that the object OB2 has been set in the area corresponding to the surface S02. The object OB2 and the circles C11, C12, C13, and C14, which are disposed at the four vertices of the object OB2, are also an example of the guide image that prompts the user to perform the operation of setting the shape of the projection image.

To move and deform the object OB2, it is assumed that the user performs operation on the touch panel 10 to move the vertex corresponding to the circle C11 in such a way that the distance between the vertex corresponding to the circle C01 and the vertex corresponding to the circle C11 is smaller than or equal to a threshold, specifically, to drag the vertex corresponding to the circle C11 into the circle C01. Upon acceptance of the operation via the touch panel 10, the setting assistance section 420 causes the position of the vertex corresponding to the circle C11 to coincide with the position of the vertex corresponding to the circle C01 and links the vertices to each other.

Similarly, when the user performs the operation of moving the vertex corresponding to the circle C14 in such a way that the distance between the vertex corresponding to the circle C02 and the vertex corresponding to the circle C14 is smaller than or equal to the threshold, the setting assistance section 420 causes the position of the vertex corresponding to the circle C14 to coincide with the position of the vertex corresponding to the circle C02 and links the vertices to each other. As a result, one area corresponding to the surfaces S01 and S02 is set, as shown in FIG. 5. In FIG. 5, the one area corresponding to the surfaces S01 and S02 is hatched. An area corresponding to the third surface S03 is similarly set and linked to the area corresponding to the surfaces S01 and S02, so that one area corresponding to the surfaces S01, S02, and S03 is set. When the operation of moving the vertices is desired to be performed in detail, the displayed captured image being displayed may be enlarged via touch operation, and the vertices may be moved in the enlarged captured image. A specific example of a method for enlarging the displayed captured image may be digital zooming. Moving the vertices in the enlarged captured image improves user friendliness of handling an arbitrary shape.

In related art, when the area where the projection image is disposed in the captured image, that is, the area occupied by the target is set, for example, by the operation of linking a plurality of polygons, the area cannot be undesirably easily set if the user is inexperienced in the linkage operation. Specifically, it is difficult in some cases for a user who is inexperienced, for example, in touch operation to adjust the position and shape of an object in such a way that the position of a vertex of the object coincides with the position of a vertex of another object. In contrast, in the present embodiment, vertices can be easily linked to each other, whereby even a user who is inexperienced, for example, in touch operation readily sets the area where the projection image is disposed in the captured image by the operation of linking a plurality of polygons.

Triggered by operation performed on the touch panel 10 that instructs start of the measurement in the situation in which the setting assistance apparatus 1 is connected to the projector 2 over the network, the measurement section 430 generates measurement pattern data from the resolution information contained in the projector information acquired by the acquisition section 410. The measurement section 430 controls the projector 2 to cause it to sequentially project a plurality of measurement patterns indicated by the measurement pattern data. The measurement section 430 controls the imaging apparatus 50 to cause it to capture an image of each of the plurality of measurement patterns sequentially projected on the target SC to measure the position of the projection image based on the plurality of captured images captured by the imaging apparatus 50.

In more detail, the measurement section 430 generates based on the plurality of captured images a transformation matrix for performing projective transformation between the coordinates of the projection image in the captured image captured by the imaging apparatus 50 and the coordinates of the projection image on a display apparatus of the projector 2. The transformation matrix is used to transform the coordinates of each of the vertices of each surface of the target SC contained in the captured image into the coordinates of the display panels. The transformation matrix is also used in the deformation that achieves geometric correction of the projection image to be projected on the target SC. In the present embodiment, when the projector 2 projects an image, for example, of a content on the target SC, the setting assistance apparatus 1 gives the projector 2 image data representing a projection image geometrically corrected by using the transformation matrix described above, and the projector 2 projects an image in accordance with the image data.

In the present embodiment, a binary code pattern is used as each of the measurement patterns, as described above. The binary code pattern refers to an image for expressing the coordinates of the display apparatus by using a binary code. The binary code is a technique for expressing each digit of a binary number that expresses an arbitrary numeral by using on and off states of a switch. When a binary code pattern is used as each of the measurement patterns, an image projected by the projector 2 corresponds to the switch described above, and it is necessary to prepare images the number of which is equal to the number of digits of the binary number representing coordinate values. Further, images for the coordinate X and images for the coordinate Y need to be separately prepared. For example, when the resolution of the display panels of the projector 2 is 120×90, the numerals 120 and 90 are each expressed by a seven-digit binary number, so that seven images are required to express the coordinate X, and another seven images are required to express the coordinate Y.

When a binary code pattern is used as each of the measurement patterns, it is generally known that ambient disturbance light, such as illumination, affects the measurement in such a way that the robustness of the measurement decreases. Therefore, when a binary code pattern is used as each of the measurement patterns, it is common practice to suppress the effect of the ambient disturbance light and further use a complimentary pattern to improve the robustness of the measurement. The complementary pattern refers to a black/white reversal image. A binary code pattern in which white represents 1 and black represents 0 is hereinafter referred to as a "positive pattern," and the black/white reversal version of the image described above or a complementary pattern is referred to as a "negative pattern." In the present embodiment, when the resolution indicated by the resolution information is 120×90, the measurement section 430 generates measurement pattern data representing 14 positive patterns and 14 negative patterns, that is, 28 measurement patterns in total, as shown in FIG. 6.

In the present embodiment, in which binary code patterns for three-dimensional measurement are used to measure the position of the projection image, even when the target SC has a complicated three-dimensional shape, the three-dimensional shape can be accurately detected, and the projection image can be deformed and the deformed projection image can be precisely attached within a preferable range of the shape. In the present embodiment, a binary code pattern is used as each of the measurement patterns, and any other type of structural light may be used, such as light having a dot pattern, a rectangular pattern, a polygonal pattern, a checker pattern, a gray code pattern, a phase shift pattern, or a random dot pattern.

Figure 7:
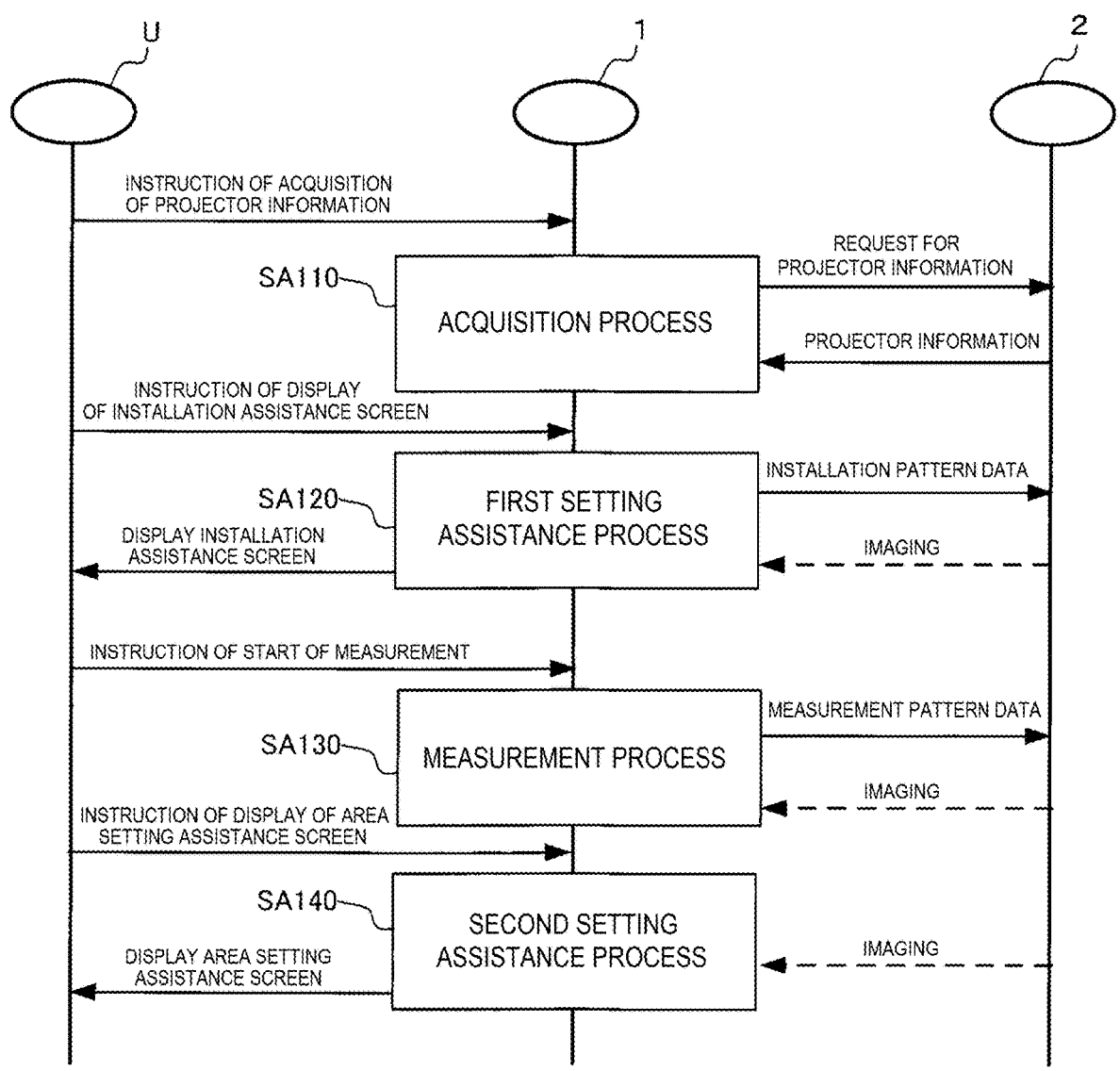
FIG. 7 shows the procedure of processes carried out by a processing apparatus of the setting assistance apparatus in accordance with a program stored in a storage apparatus.

The processing apparatus 40, which operates in accordance with the program PA, performs the setting assistance method according to the present disclosure. The setting assistance method according to the present disclosure is carried out after the projection 2 is calibrated, that is, after the setting assistance apparatus 1 is connected to the projector 2 over the network. FIG. 7 shows the procedure of the setting assistance method carried out by the processing apparatus 40 in accordance with the program PA. The setting assistance method according to the present disclosure includes an acquisition process SA110, a first setting assistance process SA120, a measurement process SA130, and a second setting assistance process SA140, as shown in FIG. 7.

The acquisition process SA110 is a process carried out when triggered by a user U's operation performed on the touch panel 10 to issue an instruction of acquisition of the projector information. In the acquisition process SA110, the processing apparatus 40 functions as the acquisition section 410. In the acquisition process SA110, the processing apparatus 40 requests the projector 2 to transmit the projector information and acquires the projector information in a reply from the projector 2.

The first setting assistance process SA120 is a process carried out when triggered by an instruction of display of the setting assistance screen given by the user U's operation performed on the touch panel 10. In the first setting assistance process SA120, the processing apparatus 40 functions as the setting assistance section 420. In the first setting assistance process SA120, the processing apparatus 40 causes the projector 2 to project the installation pattern image, and the imaging apparatus 50 captures an image of the target SC on which the projector 2 has projected the installation pattern image to generate a captured image. The processing apparatus 40 then superimposes the guide image that prompts the user to perform operation of setting the position and size of the projection image in the captured image on the captured image to generate the installation assistance screen and causes the display apparatus of the touch panel 10 to display the installation assistance screen.

The measurement process SA130 is a process carried out when triggered by start of the measurement instructed by the user U's operation performed on the touch panel 10. In the measurement process SA130, the processing apparatus 40 functions as the measurement section 430. In more detailed description, in the measurement projector SA130, the processing apparatus 40 first generates the measurement pattern data from the resolution information contained in the projector information acquired in the acquisition process SA110. The processing apparatus 40 then controls the projector 2 in such a way that the projector 2 sequentially projects a plurality of measurement patterns indicated by the measurement pattern data. The processing apparatus 40 further controls the imaging apparatus 50 to cause it to capture an image of each of the plurality of measurement patterns sequentially projected on the target SC to measure the position of the projection image based on the plurality of captured images captured by the imaging apparatus 50.

The second setting assistance process SA140 is a process carried out when triggered by an instruction of display of the area setting assistance screen given by the user U' operation performed on the touch panel 10. In the second setting assistance process SA140, the processing apparatus 40 functions as the setting assistance section 420. In the second setting assistance process SA140, whenever the user U operates the touch panel 10 to issue the area setting instruction, the processing apparatus 40 superimposes a quadrangular object on the captured image of the target SC, displays the resultant image, and moves the position of the object and deforms the object in accordance with the operation performed on the touch panel 10.

According to the setting assistance apparatus 1 of the present embodiment, the position where the setting assistance apparatus 1 and other factors thereof are so adjusted before the measurement of the position of the projection image based on the captured image of the target SC that the projection image projected on the target SC is larger than the image G02 in the captured image captured by the imaging apparatus 50. Therefore, according to the present embodiment, even a user of the projector 2 who is inexperienced in the handling of the setting assistance apparatus 1 can install the setting assistance apparatus 1 in an appropriate imaging position and accurately measure the position of the projection image. Further, according to the present embodiment, the user can perform operation after the coordinates of the captured image are associated with the coordinates of the displayed image only by looking at the displayed image displayed on the setting assistance apparatus 1 without checking the actual projection image, whereby the amount of movement of the point of sight is reduced and the user friendliness is therefore improved.

In the present embodiment, the area where the projection image is disposed in the captured image of the target SC, that is, the area occupied by the target SC needs to be set by the polygon linkage operation. However, when the second vertex is so moved that the distance between the first vertex of the first image and the second vertex of the second image is smaller than or equal to the threshold, the setting assistance apparatus 1 automatically causes the position of the second vertex to coincide with the position of the first vertex. Therefore, the setting assistance apparatus 1 according to the present embodiment allows even a user who is inexperienced, for example, in touch operation to easily link the vertices to each other and easily and accurately set the shape and size of the projection image. Further, the setting assistance apparatus 1 according to the present embodiment allows the user to easily set the area where the projection image is disposed only by manipulating the captured image of the target SC once the captured image is generated. Finally, a content created by determining the shape of the area where the projection image is disposed and assigning an image to the area is transferred to a storage area provided in the projector 2, whereby the created content can be written to a USB memory or an SD card built in the projector 2 or external thereto over the network, and the content mapped on the target SC can be reproduced without use of the setting assistance apparatus 1.

2. Variations

The following variations may be combined as appropriate with the embodiment described above.

(1) In the embodiment described above, the setting assistance apparatus 1 gives the projector 2 image data having been deformed based on the transformation matrix for performing projective transformation between the coordinates of the projection image in the captured image captured by the imaging apparatus 50 and the coordinates of the projection image on the display apparatus of the projector 2. It is, however, noted that a set of the coordinates of the vertices of each surface of the target SC contained in the captured image and the coordinates on the display panels or the transformation matrix described above may be transmitted from the setting assistance apparatus 1 to the projector 2, and the projector 2 may perform the deformation described above.

(2) The first and second images in the embodiment described above are each a quadrangular image and may instead be a polygonal image other than a quadrangular image, such as a triangular or pentagonal shape. Further, the shape of the target SC may be detected by performing image analysis on the captured image of the target SC, such as edge detection, and a polygonal image according to the result of the detection may be used as the first and second images described above.

(3) CAD (computer-aided design) data representing the shape of the target SC may be stored in the setting assistance apparatus 1, and the setting assistance apparatus 1 may carry out the process of deforming the projection image in such a way that the shape of the deformed projection image matches the shape of a projection surface indicated by the CAD data. The setting assistance apparatus 1 may cause the shape of the projection surface measured by the three-dimensional measurement to match the shape of the projection surface indicated by the CAD data, and the setting assistance apparatus 1 may further carry out the process of further adjusting the shape of the projection image having been deformed as described above in accordance with the result of the matching.

(4) In the embodiment described above, the program PA has been stored in the storage apparatus 30. The program PA may instead be manufactured or distributed as a standalone program. As a specific method for distributing the program PA, it is conceivable to employ an aspect in which the program PA described above is written onto a computer readable recording medium, such as a flash ROM (read only memory) and the medium is distributed or an aspect in which the program PA described above is distributed by downloading the program PA via an electric communication line, such as the Internet. The program PA is installed on a typical information processing apparatus, and a computer, such as a CPU, of the information processing apparatus is operated in accordance with the program, whereby the information processing apparatus can function as the setting assistance apparatus according to the present disclosure.

(5) The acquisition section 410, the setting assistance section 420, and the measurement section 430 in the embodiment described above are each a software module, and part or entirety of the acquisition section 410, the setting assistance section 420, and the measurement section 430 may be hardware. Examples of the hardware may include a DSP (digital signal processor), an ASIC (application specific integrated circuit), a PLD (programmable logic device), or an FPGA (field programmable gate array). Even when part or entirety of the acquisition section 410, the setting assistance section 420, and the measurement section 430 is hardware, the same effects as those provided by the embodiment described above can be provided.

(6) The setting assistance apparatus 1 according to the embodiment described above is a mobile terminal, such as a smartphone or a table terminal. It is, however, noted that a server apparatus that communicates with the mobile terminal via a LAN or the Internet may be provided with the acquisition section 410, the setting assistance section 420, and the measurement section 430, and the server apparatus may be allowed to function as the setting assistance apparatus 1. In this case, the smartphone described above that communicates with the server apparatus functions as the imaging apparatus that captures an image of a target on which the projector projects a projection image and the display apparatus that displays a guide image superimposed on the captured image under the control of the setting assistance apparatus 1. That is, the imaging apparatus and the display apparatus are each not an essential constituent element of the setting assistance apparatus according to the present disclosure and may instead be an external element accessible from the setting assistance apparatus.

When the present disclosure is applied only to assistance of installation of the imaging apparatus, the measurement process SA130 and the second setting assistance process SA140 described above may be omitted. Similarly, when the present disclosure is applied only to assistance of setting an area where an image is projected, the first setting assistance process SA120 and the measurement process SA130 described above may be omitted. When the measurement process SA130 is omitted, the measurement section 430 can be omitted. The setting assistance apparatus according to the present disclosure may be built in the projector. In this case, the acquisition section 410 can be omitted. When the setting assistance apparatus 1 is built in the projector, the projector can be installed and adjusted without use of a mobile terminal, whereby the user friendliness is improved.

(7) In the image display system 5 in the embodiment described above, the image supplier 4 supplies the projector 2 with image data. Instead, control data as well as the image data may be supplied from the image supplier 4 to the projector 2, and an apparatus that supplies the image data and an apparatus that supplies the control data may be separately provided. The control data includes data for controlling the projector, for example, adjusting the quality of an image from the projector, geometrically adjusting the image, and adjusting the power supply of the projector. The image data contains a content to be displayed by the projector. The image supplier 4 or an apparatus that supplies image data and an apparatus that supplies the control data can process the image data and the control data complementarily with the projector. Further, the projector or the image display system 5 can include a storage apparatus that stores the content described above, and the image supplier 4 and other components can be removed from the image display system 5 as long as the content is stored in the storage apparatus.

3. Aspect Derived from at Least One of Embodiment and Variations

The present disclosure is not limited to the embodiment or variations described above and can be achieved in a variety of aspects to the extent that they do not depart from the substance of the present disclosure. For example, the present disclosure can be achieved by the aspects below. The technical features in the embodiment described above that correspond to the technical features in the aspects described below can be replaced by or combined with other technical features as appropriate to solve part or entirety of the problems in the present disclosure or achieve part or entirety of the effects of the present disclosure. Further, when any of the technical features has not been described as an essential feature in the present specification, the technical feature can be deleted as appropriate.

The setting assistance method according to the present disclosure is a setting assistance method for assisting setting of a projection image and includes capturing an image of at least part of the projection image projected by the projector on the target to generate a captured image and prompting execution of the operation of setting at least one of the position and size of the projection image in the captured image. According to the present aspect, the user can set at least one of the position and size of the projection image by performing operation prompted by the setting assistance method according to the present disclosure. The setting assistance method according to the present disclosure therefore allows an inexperienced user to readily set at least one of the position and size of the projection image.

In the setting assistance method according to the present disclosure, the projector may project a pattern image on the target. In this case, the captured image is generated by capturing an image of the target on which the pattern image has been projected.

In the setting assistance method according to the present disclosure, a guide image that prompts execution of the operation described above may be superimposed on the captured image, and a display apparatus may display the superimposed image. According to the present aspect, the user can perform the operation of setting at least one of the position and size of the projection image in accordance with the guide screen. Even a user who is inexperienced in the operation described above can therefore readily set at least one of the position and size of the projection image.

In the setting assistance method according to the present disclosure, the guide image described above may be an image that prompts execution of the operation of setting at least one of the position, shape, and size of the projection image in the captured image. According to the present aspect, an inexperienced user can readily set at least one of the position, shape, and size of the projection image in the captured image.

In the setting assistance method according to the present disclosure, an image of the target may be captured in accordance with the guide image superimposed on the captured image, and the position of the projection image may be measured. According to the present aspect, the captured image of the target on which the pattern image has been projected may be used to associate the coordinates in the display panels of the projector with the coordinates in the captured image, and the associated coordinates can be used to set the position of the projection image.

In the setting assistance method according to the present disclosure, the guide image described above may include a first image having a first vertex and a second image having a second vertex, and when the operation of moving the second vertex in such away that the distance between the first vertex and the second vertex is smaller than or equal to a threshold is accepted, the second vertex may be so moved that position of the second vertex coincides with the position of the first vertex. According to the present aspect, when the distance between the first vertex and the second vertex is smaller than or equal to the threshold, the position of the second vertex is automatically corrected to the position of the first vertex, whereby even a user who is inexperienced in the operation of moving the second vertex can readily set an area where the projection image occupies the captured image by linking the first image and the second image to each other.

In the setting assistance method according to the present disclosure, a mobile terminal may capture an image of the target and display the captured image and the guide image. According to the present aspect, the mobile terminal can be used to set at least one of the position, shape, and size of the projection image in the captured image.

The setting assistance apparatus according to the present disclosure is a setting assistance apparatus that assists setting of a projection image and includes the processing apparatus below. The processing apparatus causes an imaging apparatus to capture an image of at least part of the projection image projected by the projector on a target to generate a captured image and prompts execution of the operation of setting at least one of the position and size of the projection image in the captured image. According to the present aspect, the user can set at least one of the position and size of the projection image by performing operation prompted by the setting assistance apparatus according to the present disclosure. The setting assistance apparatus according to the present disclosure therefore allows an inexperienced user to readily set at least one of the position and size of the projection image.

What is claimed is:

1. A setting assistance method comprising:
   capturing an image of a projection image projected by a projector on a target to generate a captured image;
   accepting an operation, executed on a display apparatus that is different from the target, of setting at least one of a position or a size of the projection image in the captured image; and
   displaying a guide image that superimposes on the captured image,
   wherein the guide image is configured to be adjusted, by executing the operation, to superimpose a designated portion on the captured image.

2. The setting assistance method according to claim 1, wherein the projector projects a pattern image on the target, and
   the captured image is generated by capturing an image of the target on which the pattern image is projected.

3. The setting assistance method according to claim 1, wherein the guide image is configured to be adjusted, by executing the operation, to fit with at least one of position, shape, or size of the projection image in the captured image.

4. The setting assistance method according to claim 3, wherein an image of the target is captured in accordance with the guide image superimposed on the captured image, and the position of the projection image is measured.

5. The setting assistance method according to claim 3, wherein the guide image includes a first image having a first vertex and a second image having a second vertex, and
   when the operation of moving the second vertex in such a way that a distance between the first vertex and the second vertex is smaller than or equal to a threshold is accepted, a position of the second vertex is caused to coincide with a position of the first vertex.

6. The setting assistance method according to claim 1, wherein a mobile terminal captures an image of the target and displays the captured image and the guide image.

7. A setting assistance apparatus comprising
   a processor programmed to:
   cause a camera to capture an image of a projection image projected by a projector on a target to generate a captured image;
   accept an operation, executed on a display apparatus that is different from the target, of setting at least one of a position or a size of the projection image in the captured image; and display a guide image that superimposes on the captured image,
wherein the guide image is configured to be adjusted, by executing the operation, to superimpose a designated portion on the captured image.

\* \* \* \* \*